US006717121B2

(12) United States Patent
Zeng et al.

(10) Patent No.: US 6,717,121 B2
(45) Date of Patent: Apr. 6, 2004

(54) PATTERNED MICROWAVE SUSCEPTOR ELEMENT AND MICROWAVE CONTAINER INCORPORATING SAME

(75) Inventors: Neilson Zeng, Toronto (CA); Laurence M. C. Lai, Mississauga (CA)

(73) Assignee: Graphic Packaging International, Inc., Marietta, GA (US)

( * ) Notice: Subject to any disclaimer, the term of this patent is extended or adjusted under 35 U.S.C. 154(b) by 86 days.

(21) Appl. No.: 10/028,328

(22) Filed: Dec. 21, 2001

(65) Prior Publication Data

US 2003/0085223 A1 May 8, 2003

Related U.S. Application Data

(60) Provisional application No. 60/325,917, filed on Sep. 28, 2001.

(51) Int. Cl.[7] .............................. H05B 6/80; B65D 81/34
(52) U.S. Cl. ...................... 219/730; 219/728; 219/729; 219/732; 426/107; 426/234; 426/243; 99/DIG. 14
(58) Field of Search ................................. 219/730, 729, 219/728, 732, 762, 725, 733, 735; 426/107, 234, 241, 109, 243, 118; 99/DIG. 14

(56) References Cited

U.S. PATENT DOCUMENTS

| | | | |
|---|---|---|---|
| 4,230,924 A | 10/1980 | Brastad et al. | 219/10.55 E |
| 4,398,994 A | 8/1983 | Beckett | 156/659.1 |
| 4,552,614 A | 11/1985 | Beckett | 156/640 |
| 4,927,991 A | 5/1990 | Wendt et al. | 219/10.55 E |
| 5,038,009 A | 8/1991 | Babbitt | 219/10.55 E |
| 5,266,386 A | 11/1993 | Beckett | 428/209 |
| 5,278,378 A | 1/1994 | Beckett | 219/728 |
| 5,310,976 A | 5/1994 | Beckett | 219/728 |
| 5,340,436 A | 8/1994 | Beckett | 156/639 |
| 5,466,917 A | * 11/1995 | Matsuki et al. | 219/730 |
| 5,519,195 A | * 5/1996 | Keefer et al. | 219/728 |
| 5,628,921 A | 5/1997 | Beckett | 216/91 |
| 5,698,127 A | 12/1997 | Lai et al. | 219/728 |
| 6,114,679 A | 9/2000 | Lai et al. | 219/728 |
| 6,133,560 A | 10/2000 | Zeng et al. | 219/730 |
| 6,137,099 A | 10/2000 | Hamblin | 219/730 |
| 6,204,492 B1 | 3/2001 | Zeng et al. | 219/728 |
| 6,251,451 B1 | 6/2001 | Zeng | 426/107 |

* cited by examiner

Primary Examiner—Philip H. Leung
(74) Attorney, Agent, or Firm—Dorsey & Whitney LLP

(57) ABSTRACT

A container has a patterned susceptor region in the bottom, a fold region between the bottom and the sidewall of the container, a sidewall region, and a flange region that forms a flange or lip of the container. The patterned susceptor region includes arrangements of microwave-interactive features disposed generally along respective close plane curves, which reduces overheating and increases the filling temperature of the food product. The fold region contains microwave transparent features that minimize de-lamination of the container in the folded region, and also create a generally transmissive area in the vicinity of the heel of the food product to improve the cooking thereof. The sidewall region shields the periphery of the food product so that it is not overcooked while promoting an appropriate degree of pie dough shell browning. The flange area is transmissive to promote an appropriate degree of cooking of the food product crust.

36 Claims, 9 Drawing Sheets

PATTERNED MICROWAVE SUSCEPTOR ELEMENT AND MICROWAVE CONTAINER INCORPORATING SAME

CROSS-REFERENCE TO RELATED APPLICATION

This application claims the benefit of U.S. Provisional Patent Application No. 60/325,917, filed Sep. 28, 2001 (Zeng et al., "Patterned microwave susceptor element and microwave container incorporating same"), which is hereby incorporated herein by reference in its entirety.

BACKGROUND OF THE INVENTION

1. Field of the Invention

The present invention relates to microwave cooking of foods, and more particularly to a patterned microwave susceptor element and container incorporating same.

2. Description of the Related Art

The principle behind the cooking of foods in a microwave is well known. Briefly, food product is excited by the microwave energy and molecules of the food product become excited to produce heat. Characteristically, the food product cooks more quickly on the inside than on the outside, compared with conventional oven cooking. If browning or crisping of the exterior of the food product is desired, the food product is placed in a container that includes an element known as a susceptor. The susceptor packaging typically is made of microwave interactive material and absorbs, reflects and transmits microwave energy in varying proportions depending on the type of food product and its working condition in the microwave oven. The surface to be browned is placed near the susceptor. The susceptor becomes hot through microwave absorption when exposed to microwave energy, thereby increasing the amount of heat supplied to the food product exterior to promote surface browning. Some of the microwave energy is transmitted to heat the inside of the food product.

Many types of food products typically are cooked in generally bowl-shaped containers, which generally have at least slightly flattened bottoms and which generally appear circular in a top plan view. Some of these food products such as fruit pies and pot pies include a frozen pie dough shell containing one or more suitable fillings. FIG. 1 shows one type of microwave container, a bowl 10, that is used to cook a food product having a frozen pie dough shell and one or more fillings. The bowl 10 is formed from a laminate made from a layer of microwave transparent material 12, typically a polymeric sheet, on which a thin layer of electroconductive material 14 such as aluminum has been formed, typically by sputter deposition, and which has been bonded to a microwave transparent supporting substrate 16 such as a paper sheet. The thin aluminum layer 14 is sputter-deposited on the polymeric sheet to form a plain susceptor that abuts the bottom, heel, side walls, and crust of the pie dough shell when the food product (not shown) is placed in the bowl 10.

Unfortunately, the bowl 10 does not perform well in some microwave ovens for some types of food products. For example, many food products having a frozen pie dough shell container do not cook properly in the bowl 10. When such food products are exposed to microwave energy for a sufficient time to brown the pie dough shell, some part of the filling may not be sufficiently heated due to the excess reflection of microwave power by the susceptor. On the other hand, if the food product within the bowl 10 is exposed to microwave energy for an extended period of time to ensure that the filling is sufficiently cooked throughout, portions of the filling may overheat and parts of the pie dough shell may overcook or burn.

It is desirable to develop a microwave container for food products generally, and particularly a microwave bowl for a pie dough shell food product, that adequately and relatively uniformly cooks the filling in a pie dough shell while suitably browning the pie dough shell.

BRIEF SUMMARY OF THE INVENTION

Advantageously, an aspect of the patterned susceptor of the present invention has improved uniformity and adequacy of cooking relative to the plain susceptor of the prior art when used to cook certain food products, especially food products having a frozen pie dough shell containing a filling.

Advantageously, an aspect of the patterned susceptor of the present invention, when used in a container, has a reduced tendency toward de-lamination in the area between the bottom and sidewall of the container.

These and other advantages are realized separately or in combination in various embodiments of the present invention. One embodiment of the present invention is a microwave heating surface comprising a plurality of non-overlapping closed curvilinear heating regions distributed generally throughout the heating surface, at least a first one of the closed curvilinear heating regions comprising a first plurality of discrete microwave absorptive features that are spaced-apart for enhancing microwave transmission and reducing microwave reflectance of the heating surface under load relative to a plain susceptor.

Another embodiment of the present invention is a microwave heating surface comprising a plurality of discrete microwave absorptive features distributed generally throughout the microwave heating surface in a plurality of non-overlapping closed curvilinear heating regions and spaced-apart for enhancing microwave transmission and reducing microwave reflectance of the heating surface under load relative to a plain susceptor.

Another embodiment of the present invention is a microwave susceptor structure comprising a first layer of microwave transparent material and a second layer of patterned microwave interactive material. The patterned microwave interactive material comprises a plurality of arrangements of microwave interactive features, the arrangements comprising repeating patterns of some of the microwave interactive features disposed generally along respective close plane curves that are generally symmetrical about at least two orthogonal axes.

Another embodiment of the present invention is a microwave susceptor structure comprising a first layer of microwave transparent material and a second layer of patterned microwave interactive material. The second layer of patterned microwave interactive material comprises a first arrangement of substantially identical first microwave interactive features along a circle of a first radius; a second arrangement of substantially identical second microwave interactive features along a circle of a second radius greater than the first radius, the second arrangement being concentric with the first arrangement; a third arrangement of substantially identical third microwave interactive features along a circle of a third radius greater than the second radius, the third arrangement being concentric with the second arrangement; and a fourth arrangement of substantially identical fourth microwave interactive features along a circle of a fourth radius greater than the third radius, the fourth arrangement being concentric with the third arrangement.

Another embodiment of the present invention is a microwave susceptor structure comprising a first layer of microwave transparent material and a second layer of patterned microwave interactive material. The second layer of patterned microwave interactive material comprises a first arrangement of substantially identical first microwave interactive features along a circle of a first radius; a second arrangement of substantially identical second microwave interactive features along a circle of a second radius greater than the first radius, the second arrangement being concentric with the first arrangement; a third arrangement of substantially identical microwave transparent features along a circle of a third radius greater than the second radius, the third arrangement being concentric with the second arrangement; and a fourth arrangement of a microwave interactive strip along a circle of a fourth radius greater than the third radius, the fourth arrangement being concentric with the third arrangement.

Another embodiment of the present invention is a microwave susceptor blank comprising a first layer of microwave transparent material, a second layer of patterned microwave interactive material, and a third layer of microwave transparent material. The second layer is disposed between the first and third layers. The patterned microwave interactive material comprises a bottom heating region, a fold region bounding the bottom heating region, and a sidewall region bounding the fold region. The fold region comprises a plurality of curvilinear microwave transparent features disposed generally through out the fold region in a generally repeating pattern for relieving thermal stress in the fold region during heating of the susceptor.

Another embodiment of the present invention is a microwave susceptor blank comprising a first layer of microwave transparent material; a second layer of patterned microwave absorptive material formed on the first layer and comprising a bottom heating region, a fold region bounding the bottom heating region, and a sidewall region bounding the fold region; and a third layer of microwave transparent supportive material; the first and third layers being laminated with the second layer disposed therebetween. The bottom heating region comprises a plurality of non-overlapping closed curvilinear heating regions distributed generally throughout the bottom heating region, at least a first one of the closed curvilinear heating regions comprising a first plurality of discrete spaced-apart microwave absorptive features for enhancing microwave transmission and reducing microwave reflectance of the bottom heating region under load relative to a plain susceptor. The fold region comprises a generally continuous microwave absorptive feature having a plurality of curvilinear microwave transparent features disposed therein in a generally repeating pattern for relieving thermal stress in the fold region upon exposure thereof to microwave energy. The sidewall region comprises a generally continuous microwave absorptive feature.

Another embodiment of the present invention is a microwave container comprising a bottom heating region, a fold region, and a sidewall region disposed on a microwave transparent supporting substrate. The bottom heating region comprises a plurality of non-overlapping closed curvilinear heating regions distributed generally throughout the bottom heating region and disposed on a microwave transparent supporting substrate, at least a first one of the closed curvilinear heating regions comprising a first plurality of discrete microwave absorptive features that are spaced-apart for enhancing microwave transmission and reducing microwave reflectance of the bottom heating region under load relative to a plain susceptor. The fold region is disposed about the bottom region and comprises a generally continuous microwave absorptive feature having a plurality of curvilinear microwave transparent features disposed therein in a generally repeating pattern for relieving thermal stress in the fold region upon exposure to microwave energy. The sidewall region is disposed about the fold region and comprises a generally continuous microwave absorptive feature.

Another embodiment of the present invention is a microwave container comprising a bottom region, a fold region disposed about the bottom region, and a sidewall region disposed about the fold region. The bottom region, the fold region, and the sidewall region are formed from a laminated material comprising a first layer of microwave transparent material, a second layer of patterned microwave interactive material, and a third layer of microwave transparent material, the second layer being disposed between the first and third layers. The patterned microwave interactive material in the bottom region comprises a plurality of arrangements of microwave interactive features, the arrangements comprising repeating patterns of some of the microwave interactive features disposed generally along respective close plane curves that are generally symmetrical about at least two orthogonal axis. The patterned microwave interactive material in the fold region comprises a plurality of curvilinear microwave transparent features disposed generally through out the fold region in a generally repeating pattern for relieving thermal stress in the fold region during microwave heating. The patterned microwave interactive material in the sidewall region comprising a microwave interactive strip disposed generally throughout the sidewall region.

DETAILED DESCRIPTION OF THE INVENTION, INCLUDING THE BEST MODE

Figure 2:
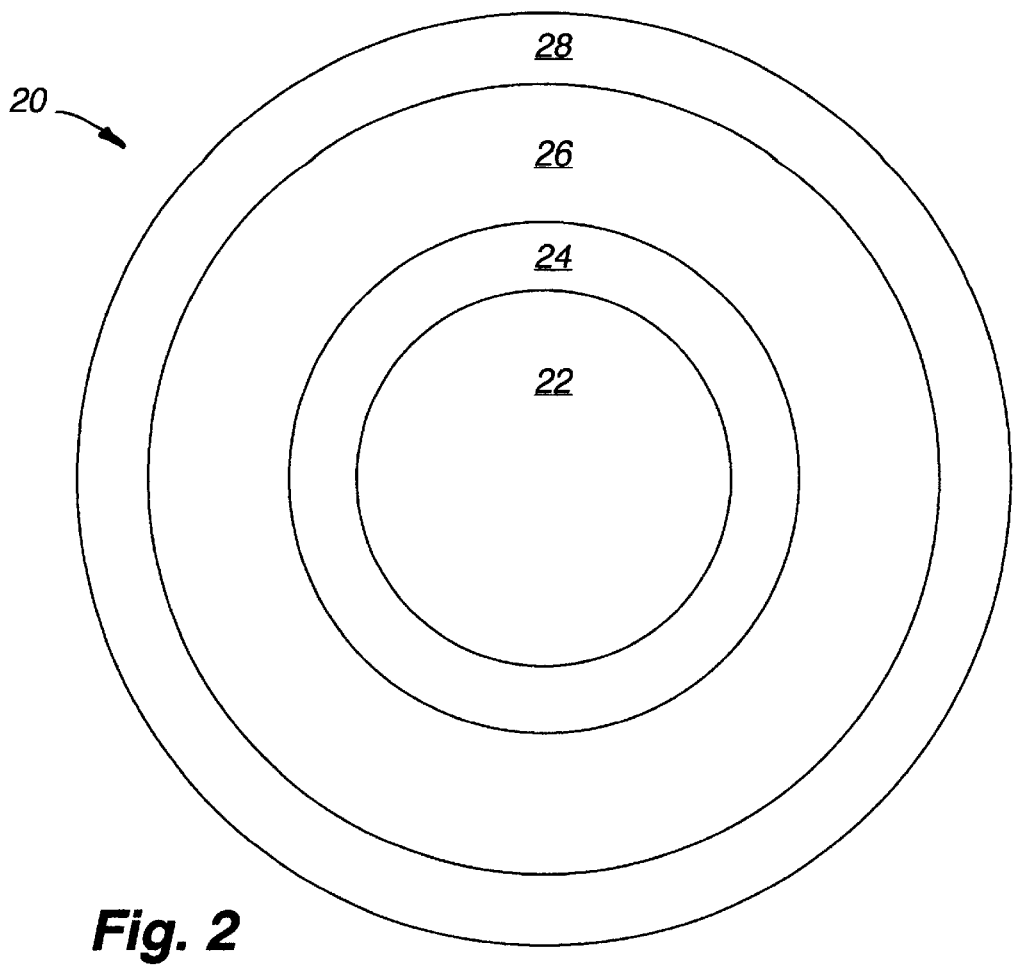
FIG. 2 is a schematic representation of a susceptor blank.
Figure 3:
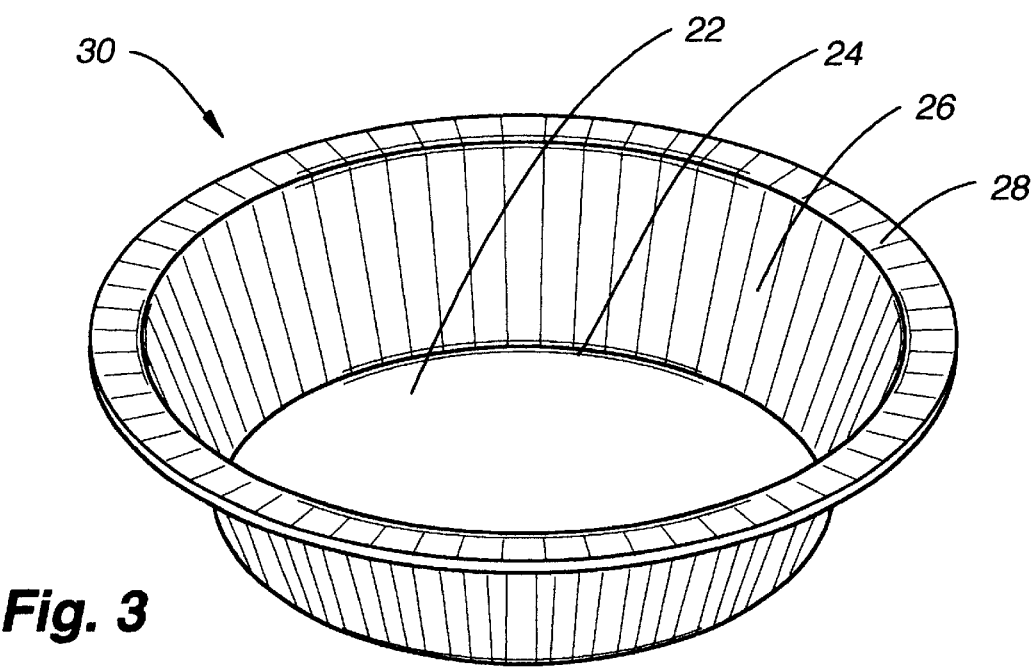
FIG. 3 is a perspective representation of a container made from the susceptor blank of FIG. 2.

FIG. 2 shows a generalized example of a patterned susceptor blank 20 that is suitable for being pressed into a circular bowl 30, which is shown in FIG. 3. Suitable variations of the susceptor blank 20 may be used for fabricating other container shapes, including elliptical bowls as well as rectangular and square trays. The susceptor blank 20 generally contains four regions 22, 24, 26 and 28 that are formed into corresponding parts of the bowl. The patterned susceptor region 22 is a circular region that forms the bottom of the bowl 30. The fold region 24 is an annular region that is folded to create a transition region between the bottom and the sidewall of the bowl 30. The sidewall region 26 is an annular region that is crimped to form the sidewall of the bowl 30. The flange region 28 is an annular region that is bent away from the sidewall region 26 and crimped to form a flange or lip of the bowl 30. The sizes of the regions 22, 24, 26 and 28 are selected based on the dimensions of the food product. For example, a bowl suitable for a food product such as a chicken pot pie might have a base diameter of 9 cm, a sidewall height of 4 cm, a sidewall angle of 65°, an inside top diameter of 12 cm, and an outside top diameter to the edge of the flange of 14 cm. The patterned susceptor region 22, the fold region 24, the sidewall region 26, and the flange region 28 of a susceptor blank suitable for such a bowl would have, illustratively, the following respective radial lengths: 32 mm, 45 mm, 85 mm and 95 mm.

The material used for the susceptor is a microwave interactive material that is sufficiently thin to cause heating when exposed to a microwave field. The thinness of the material reduces the conductivity and the microwave reflectance characteristics of the susceptor relative to conductive metallic foils. A suitable material is aluminum having a thickness in a range of about 50 Å to about 200 Å and an optical density in a range of about 0.1 through about 0.5. These dimensions are not critical, and other materials and dimensions consistent with the principles set forth in this description may also be used if desired.

The susceptor blank 20 is fabricated by any suitable process. Illustratively, the susceptor material is formed on one side of a microwave transparent substrate such as a sheet of polymeric material, the other side of which is suitable for contact with a food product. Some techniques for forming microwave interactive material includes the evaporation or sputtering of metallic or metal-containing material. Some suitable susceptor materials are described in U.S. Pat. Nos. 4,230,924 and 4,927,991. The susceptor material is patterned using any suitable process. One suitable process is a batch etching process, which uses an aqueous etchant such as aqueous sodium hydroxide solution. Etching processes are described in, for example, U.S. Pat. Nos. 4,398,994, 4,552,614, 5,310,976, 5,266,386, 5,340,436 and 5,628,921, which are incorporated herein by reference thereto in their entirety. Suitable demetallization services are available from Graphic Packaging Corporation of Golden, Colo., under the trademark and service mark DE-MAT. Yet another technique involves the direct printing of a mild acid or caustic on the thin metallic layer using a Gravure cylinder, followed by a rinse step. After the susceptor material is patterned, the susceptor side of the polymeric material is bonded or applied to a microwave transparent supportive substrate such as a polymeric film or paper or paperboard. Methods of applying a susceptor layer onto a suitable supportive substrate are more fully described in U.S. Pat. Nos. 5,266,386 and 5,340,436, which are hereby incorporated herein by reference in their entirety.

The various regions each function in particular ways to improve the uniformity of cooking of the food product. The patterned susceptor region 22 optimizes the reflection—absorption—transmission characteristics of the susceptor for the particular type of food product contained in the bowl 30, so that the food bottom surface and the filling are heated to the appropriate temperatures. The fold region 24 minimizes de-lamination of the bowl 30 in the highly stressed folded region between the bottom and sidewall of the bowl 30, and also creates a generally transmissive area in the vicinity of the heel of the food product to improve the cooking thereof. The sidewall region 26 shields the periphery of the food product so that it is not overcooked while promoting an appropriate degree of pie dough shell browning. The flange area is transmissive to promote an appropriate degree of cooking of the food product crust.

The patterned susceptor region 22 contains a susceptor having a number of concentric annular arrangements of features. The shape and size of the features and the spacing between the features in each annular arrangement and between the features of adjacent annular arrangements establishes the respective effects of these annular arrangements on the radiant heating (through absorption) and microwave fields (through transmission and reflection) to which the food product is exposed, while the concentric nature of the annular arrangements promotes a generally symmetrical cumulative effect about the vertical axis of the food product. Relative to the plain susceptor of the bowl 10, the patterned susceptor region 22 reflects less microwave energy and transmits more microwave energy to promote improved uniformity of heating throughout the food product and uniformity of browning of the pie dough shell.

Various examples of patterns suitable for the patterned susceptor region 22 are shown in FIGS. 4–7. FIG. 8 shows a plain susceptor 80 for comparison. All feature shapes and dimensions are illustrative.

Figure 4:
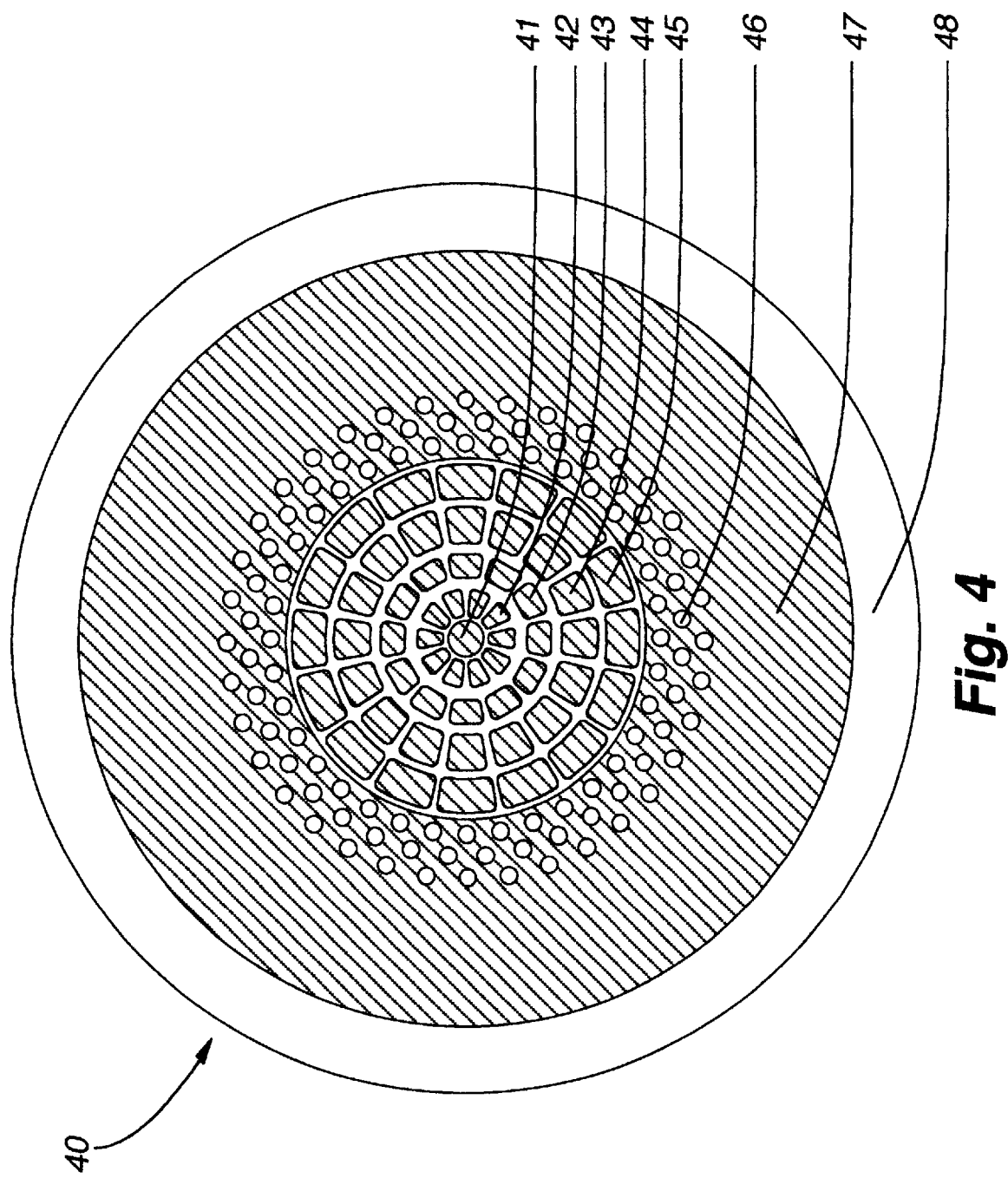
FIG. 4 is a pictorial representation of a illustrative circular susceptor blank.

The patterned susceptor 40 of FIG. 4 has a central microwave interactive disk 41 of radius 4 mm. The disk 41 is surrounded by a first concentric annular arrangement of ten patch shaped features substantially identical to patch 42. The patch 42 is roughly trapezoidal in shape, having two opposing edges corresponding to just under 25.4° of arc at radii 5 mm and 11 mm, and two other opposing edges aligned along radial lines. The minimum microwave transparent spaces between patch 42 and adjacent patches in the first annular arrangement is 1 mm. The first annular arrangement of patches is surrounded by a second concentric annular arrangement of twelve patch shaped features substantially identical to patch 43. The patch 43 is roughly trapezoidal in shape, having two opposing edges corresponding to just under 24.9° of arc at radii 13.6 mm and 19 mm, and two other opposing edges aligned along radial lines. The minimum microwave transparent space between patch 43 and adjacent patches in the second annular arrangement is 1.3 mm. The microwave transparent space between patch 43 and 42 is 2.6 mm. The second annular arrangement of patches is surrounded by a third concentric annular arrangement of sixteen patch shaped features substantially identical to patch 44. The patch 44 is roughly trapezoidal in shape, having two opposing edges corresponding to just under 18.2° of arc at radii 21 mm and 29 mm, and two other opposing edges aligned along radial lines. The minimum microwave transparent space between patch 44 and adjacent patches in the second annular arrangement is 1.7 mm. The minimum microwave transparent space between patch 44 and 43 is 2 mm. The third annular arrangement of patches is surrounded by a fourth concentric annular arrangement of sixteen patch shaped features substantially identical to patch 45. The patch 45 is roughly trapezoidal in shape, having two opposing edges corresponding to just under 20.4° of arc at radii 30.8 mm and 38.2 mm, and two other opposing edges aligned along radial lines. The minimum microwave transparent space between patch 45 and adjacent patches in the second annular arrangement is 1.2 mm. The microwave transparent space between patch 45 and 44 is 1.8 mm.

Figure 1:
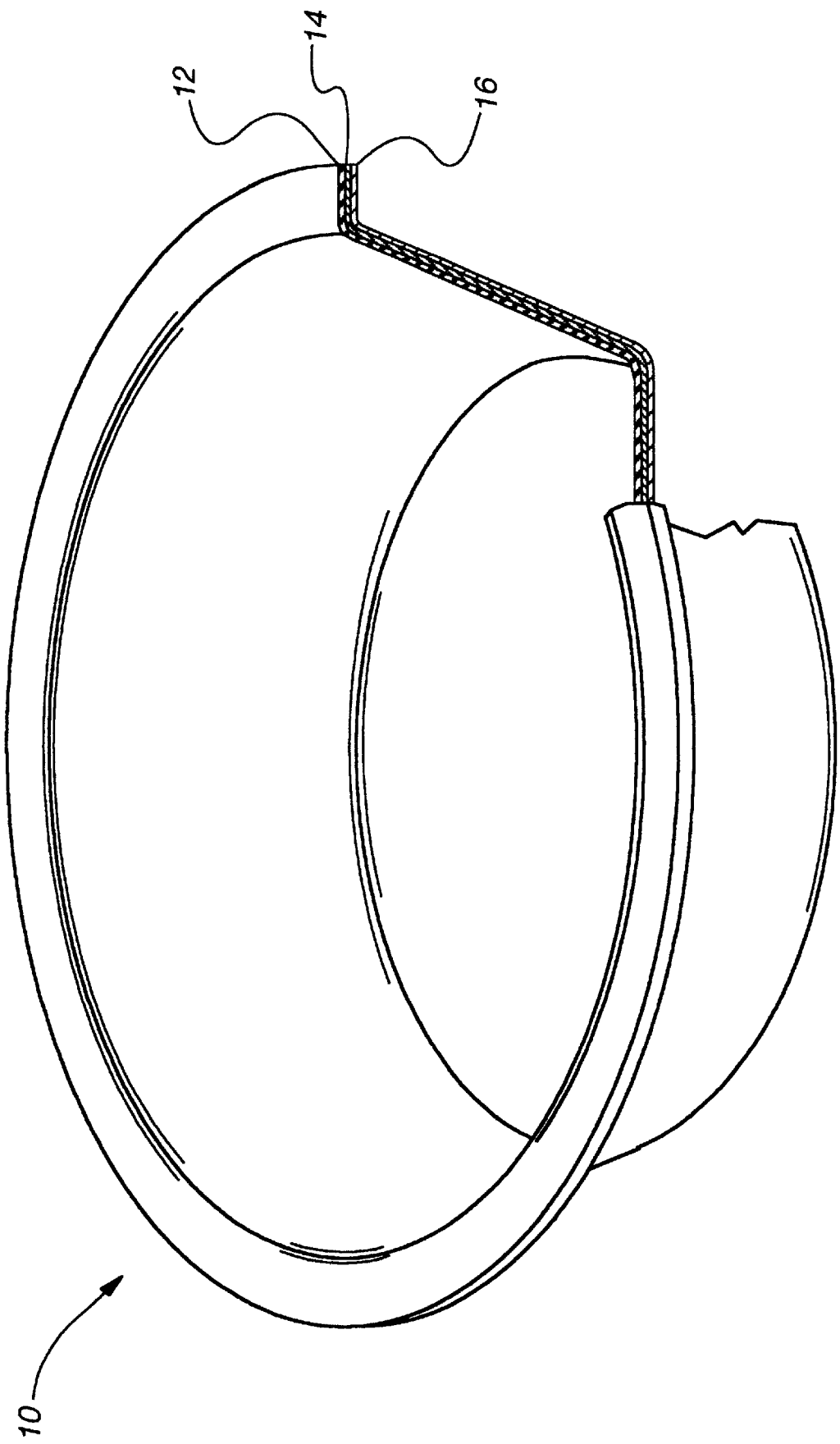
FIG. 1 is a side plan view of a prior art bowl with a cutout portion thereof shown in cross section.

An annular band of coherent susceptor material 47 surrounds and is concentric with the fourth concentric annular arrangement of patches 45. The annular band of susceptor material 47 is provided in the sidewall region 26 (as shown in FIG. 1) and provides both a shielding effect about the periphery of the food product to prevent overcooking, while at the same time providing a browning and crisping effect through the generation of radiant heat. An array of microwave transparent apertures 46 is formed within the annular band of susceptor material 47 adjacent to the fourth concentric annular arrangement of patches 45. As shown in FIG. 4, three concentric rows of thirty-six microwave transparent apertures 46 in each row fall within the fold region 24 (as shown in FIG. 1) of the patterned susceptor 40. The microwave transparent apertures 46 help minimize delamination in the highly stressed fold region between the bottom and the sidewall and provide a generally transmissive area to improve the cooking of the heel of the food product. Finally, a microwave transparent flange 48 is formed surrounding and concentric with the annular band of susceptor material 47 and extending to the edge of the patterned susceptor 40. The microwave transparent flange 48 does not heat like the susceptor covered regions of the patterned susceptor 40 and thereby provides a surface for easy grasping or holding by the user. The microwave transparent flange 48 further allows direct heating, for example, of a pie crust edge, from the incident microwave energy.

Figure 5:
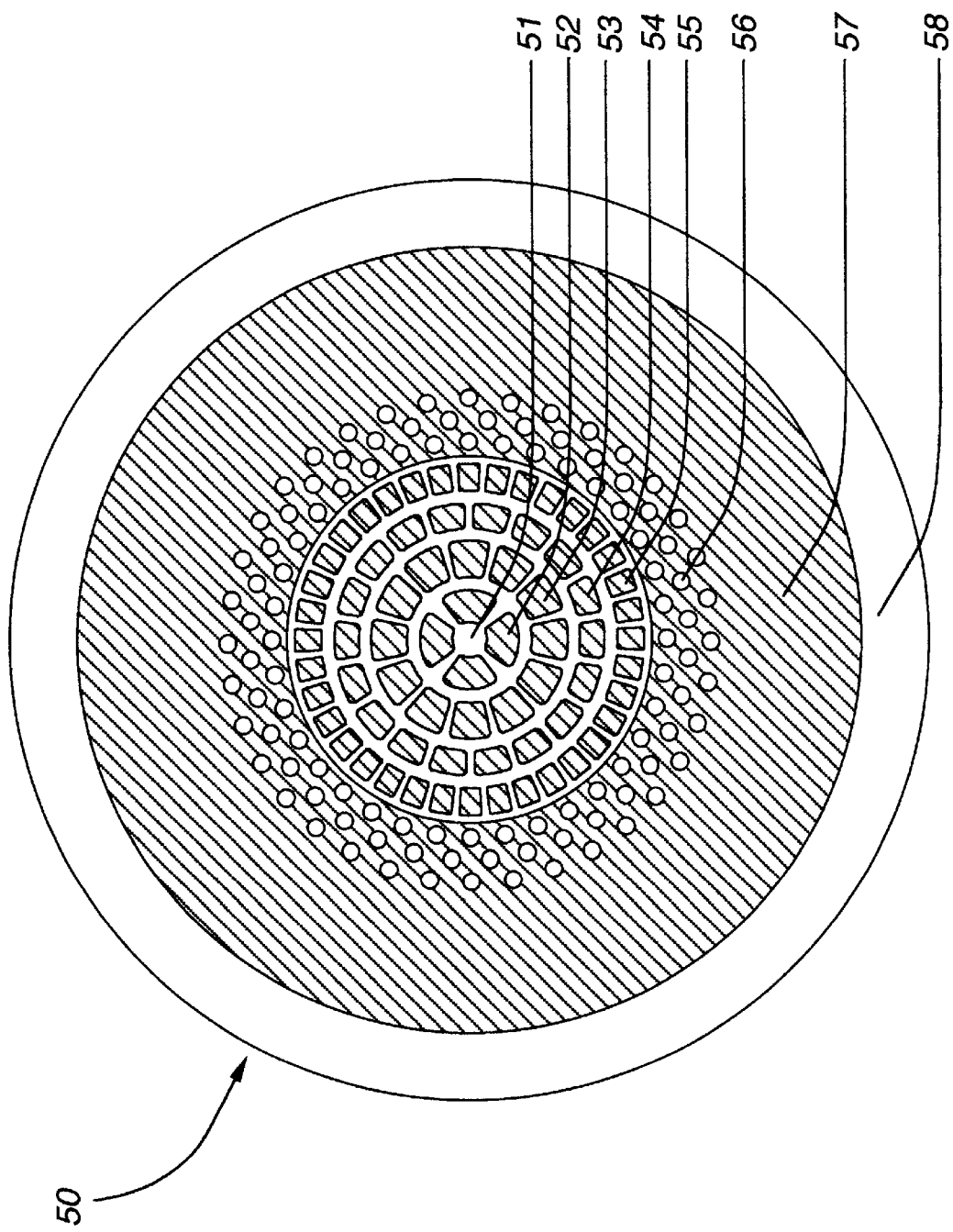
FIG. 5 is a pictorial representation of another illustrative circular susceptor blank.

The patterned susceptor 50 of FIG. 5 has a central microwave transparent window 51. The window 51 is surrounded by a first concentric annular arrangement of four patch shaped features substantially identical to patch 52. The patch 52 is roughly trapezoidal in shape, having two opposing edges corresponding to just under 66.5° of arc at radii 4 mm and 11 mm, and two other opposing edges aligned along radial lines. The minimum microwave transparent spaces between patch 52 and adjacent patches in the first annular arrangement is 1.9 mm. The first annular arrangement of patches is surrounded by a second concentric annular arrangement of twelve patch shaped features substantially identical to patch 53. The patch 53 is roughly trapezoidal in shape, having two opposing edges corresponding to just under 26.6° of arc at radii 13.7 mm and 21.5 mm, and two other opposing edges aligned along radial lines. The minimum microwave transparent space between patch 53 and adjacent patches in the second annular arrangement is 1.7 mm. The microwave transparent space between patch 53 and 52 is 2.7 mm. The second annular arrangement of patches is surrounded by a third concentric annular arrangement of eighteen patch shaped features substantially identical to patch 54. The patch 54 is roughly trapezoidal in shape, having two opposing edges corresponding to just under 18° of arc at radii 24.2 mm and 29.5 mm, and two other opposing edges aligned along radial lines. The minimum microwave transparent space between patch 54 and adjacent patches in the third annular arrangement is 2.2 mm. The microwave transparent space between patch 54 and 53 is 2.7 mm. The third annular arrangement of patches is surrounded by a fourth concentric annular arrangement of thirty-six patch shaped features substantially identical to patch 55. The patch 55 is roughly trapezoidal in shape, having two opposing edges corresponding to just under 7.25° of arc at radii 32.3 mm and 38.2 mm, and two other opposing edges aligned along radial lines. The minimum microwave transparent space between patch 55 and adjacent patches in the second annular arrangement is 1.6 mm. The microwave transparent space between patch 55 and 54 is 2.8 mm.

An annular band of coherent susceptor material 57 surrounds and is concentric with the fourth concentric annular arrangement of patches 55. The annular band of susceptor material 57 is provided in the sidewall region 26 (as shown in FIG. 1) and provides both a shielding effect about the periphery of the food product to prevent overcooking, while at the same time providing a browning and crisping effect through the generation of radiant heat. An array of microwave transparent apertures 56 is formed within the annular band of susceptor material 57 adjacent to the fourth concentric annular arrangement of patches 55. As shown in FIG. 5, three concentric rows of thirty-six microwave transparent apertures 56 in each row fall within the fold region 24 (as shown in FIG. 1) of the patterned susceptor 50. The microwave transparent apertures 56 help minimize delamination in the highly stressed fold region between the bottom and the sidewall and provide a generally transmissive area to improve the cooking of the heel of the food product. Finally, a microwave transparent flange 58 is formed surrounding and concentric with the annular band of susceptor material 57 and extending to the edge of the patterned susceptor 50. The microwave transparent flange 58 does not heat like the susceptor covered regions of the patterned susceptor 50 and thereby provides a surface for easy grasping or holding by the user. The microwave transparent flange 58 further allows direct heating, for example, of a pie crust edge, from the incident microwave energy.

Figure 6:
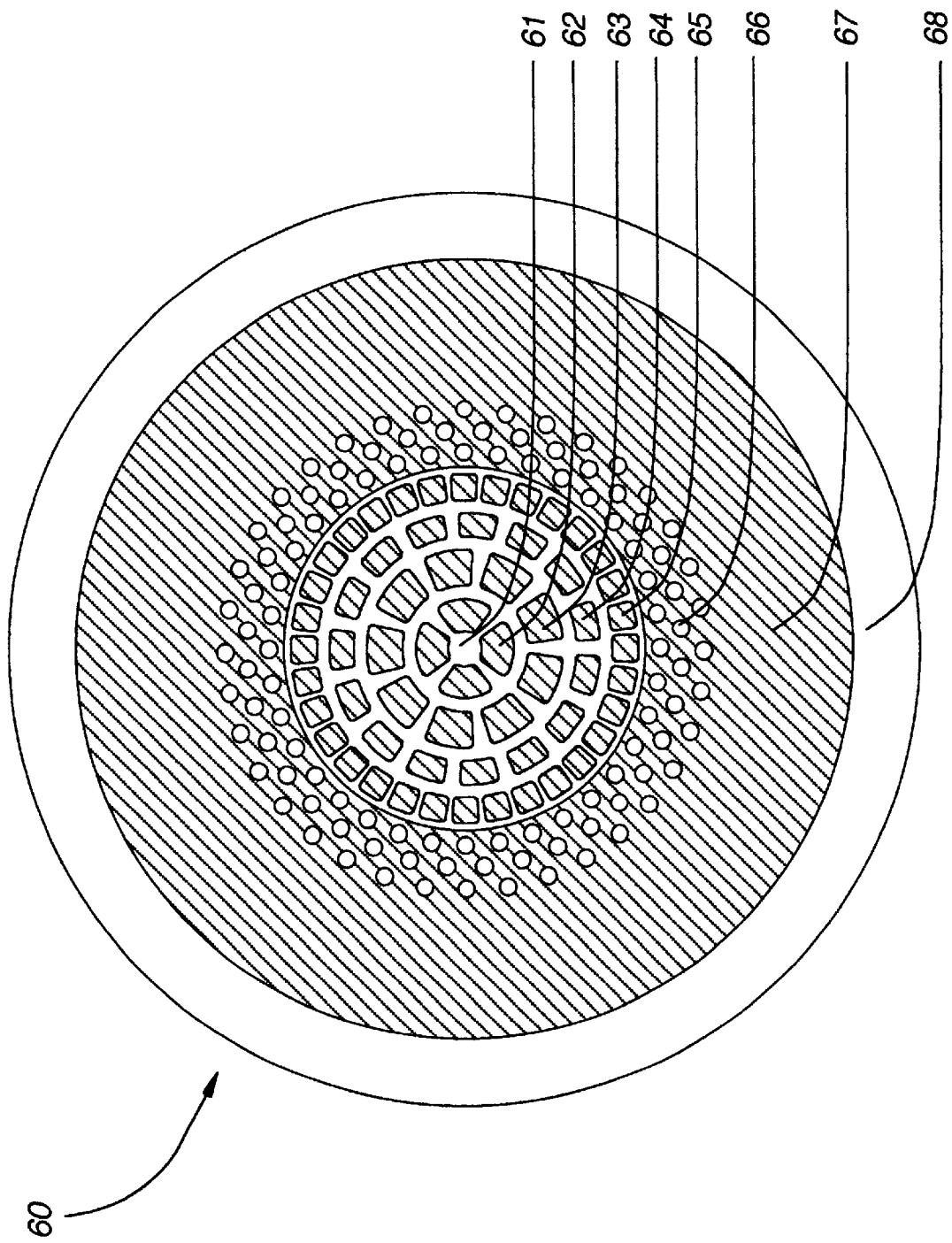
FIG. 6 is a pictorial representation of another illustrative circular susceptor blank.

The patterned susceptor 60 of FIG. 6 has a central microwave transparent window 61. The window 61 is surrounded by a first concentric annular arrangement of four patch shaped features substantially identical to patch 62. The patch 62 is roughly trapezoidal in shape, having two opposing edges corresponding to just under 66.5° of arc at radii 4 mm and 11 mm, and two other opposing edges aligned along radial lines. The minimum microwave transparent spaces between patch 62 and adjacent patches in the first annular arrangement is 1.9 mm. The first annular arrangement of patches is surrounded by a second concentric annular arrangement of nine patch shaped features substantially identical to patch 63. The patch 63 is roughly trapezoidal in shape, having two opposing edges corresponding to just under 26.6° of arc at radii 13.7 mm and 21.5 mm, and two other opposing edges aligned along radial lines. The minimum microwave transparent space between patch 63 and adjacent patches in the second annular arrangement is 1.7 mm. The microwave transparent space between patch 63 and 62 is 2.8 mm. The second annular arrangement of patches is surrounded by a third concentric annular arrangement of fifteen patch shaped features substantially identical to patch 64. The patch 64 is roughly trapezoidal in shape, having two opposing edges corresponding to just under 18° of arc at radii 24.2 mm and 29.5 mm, and two other opposing edges aligned along radial lines. The minimum microwave transparent space between patch 64 and adjacent patches in the third annular arrangement is 1.9 mm. The microwave transparent space between patch 64 and 63 is 2.7 mm. The third annular arrangement of patches is surrounded by a fourth concentric annular arrangement of thirty-two patch shaped features substantially identical to patch 65. The patch 65 is roughly trapezoidal in shape, having two opposing edges corresponding to just under 7.25° of arc at radii 32.3 mm and 38.2 mm, and two other opposing edges aligned along radial lines. The minimum microwave transparent space between patch 65 and adjacent patches in the second annular arrangement is 1.6 mm. The microwave transparent space between patch 65 and 64 is 2.9 mm.

An annular band of coherent susceptor material 67 surrounds and is concentric with the fourth concentric annular arrangement of patches 65. The annular band of susceptor material 67 is provided in the sidewall region 26 (as shown in FIG. 1) and provides both a shielding effect about the periphery of the food product to prevent overcooking, while at the same time providing a browning and crisping effect through the generation of radiant heat. An array of microwave transparent apertures 66 is formed within the annular band of susceptor material 67 adjacent to the fourth concentric annular arrangement of patches 65. As shown in FIG. 6, three concentric rows of thirty-six microwave transparent apertures 66 in each row fall within the fold region 24 (as shown in FIG. 1) of the patterned susceptor 60. The microwave transparent apertures 66 help minimize delamination in the highly stressed fold region between the bottom and the sidewall and provide a generally transmissive area to improve the cooking of the heel of the food product. Finally, a microwave transparent flange 68 is formed surrounding and concentric with the annular band of susceptor material 67 and extending to the edge of the patterned susceptor 60. The microwave transparent flange 68 does not heat like the susceptor covered regions of the patterned susceptor 60 and thereby provides a surface for easy grasping or holding by the user. The microwave transparent flange 68 further allows direct heating, for example, of a pie crust edge, from the incident microwave energy.

Figure 7:
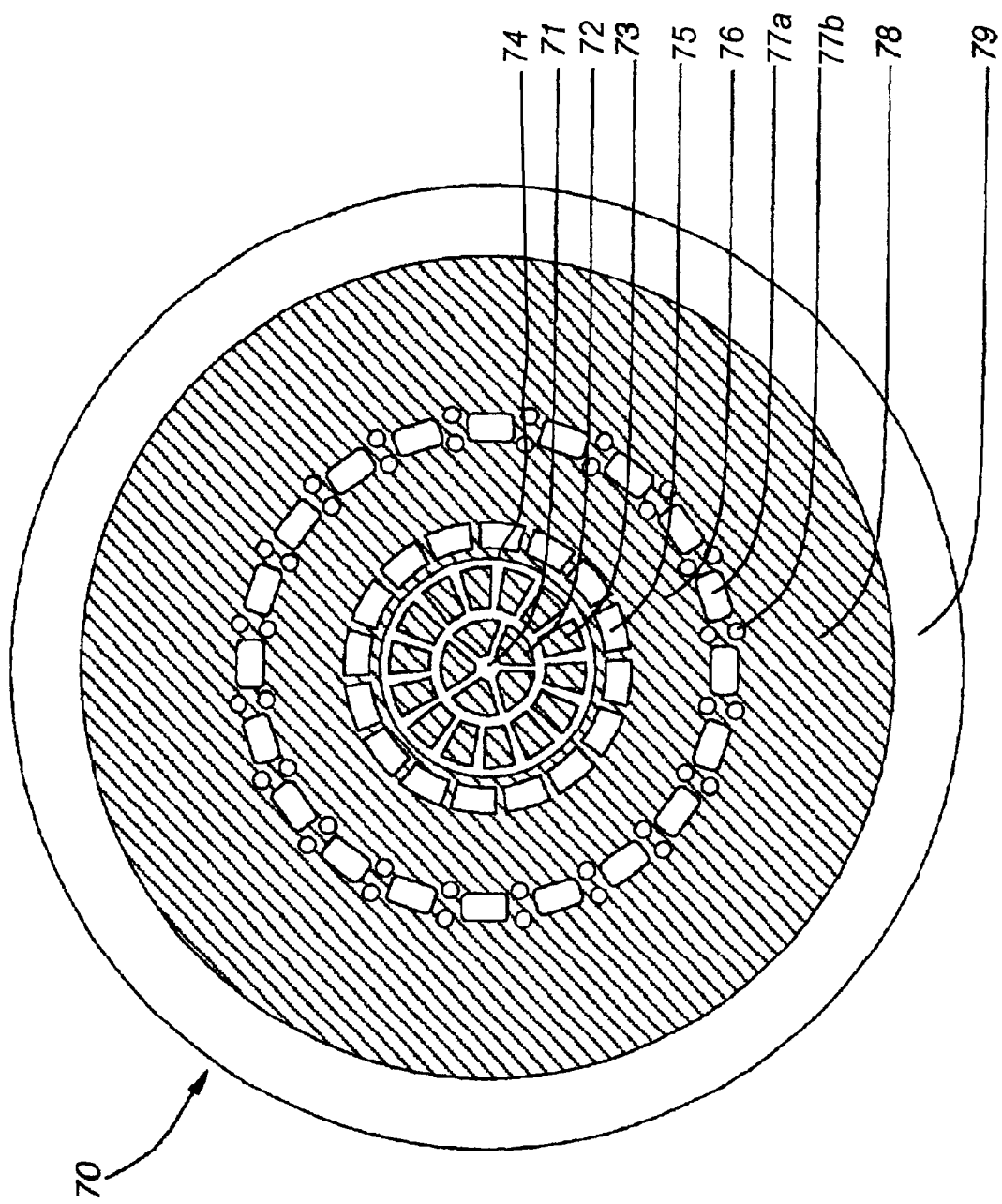
FIG. 7 is a pictorial representation of another illustrative circular susceptor blank.
Figure 8:
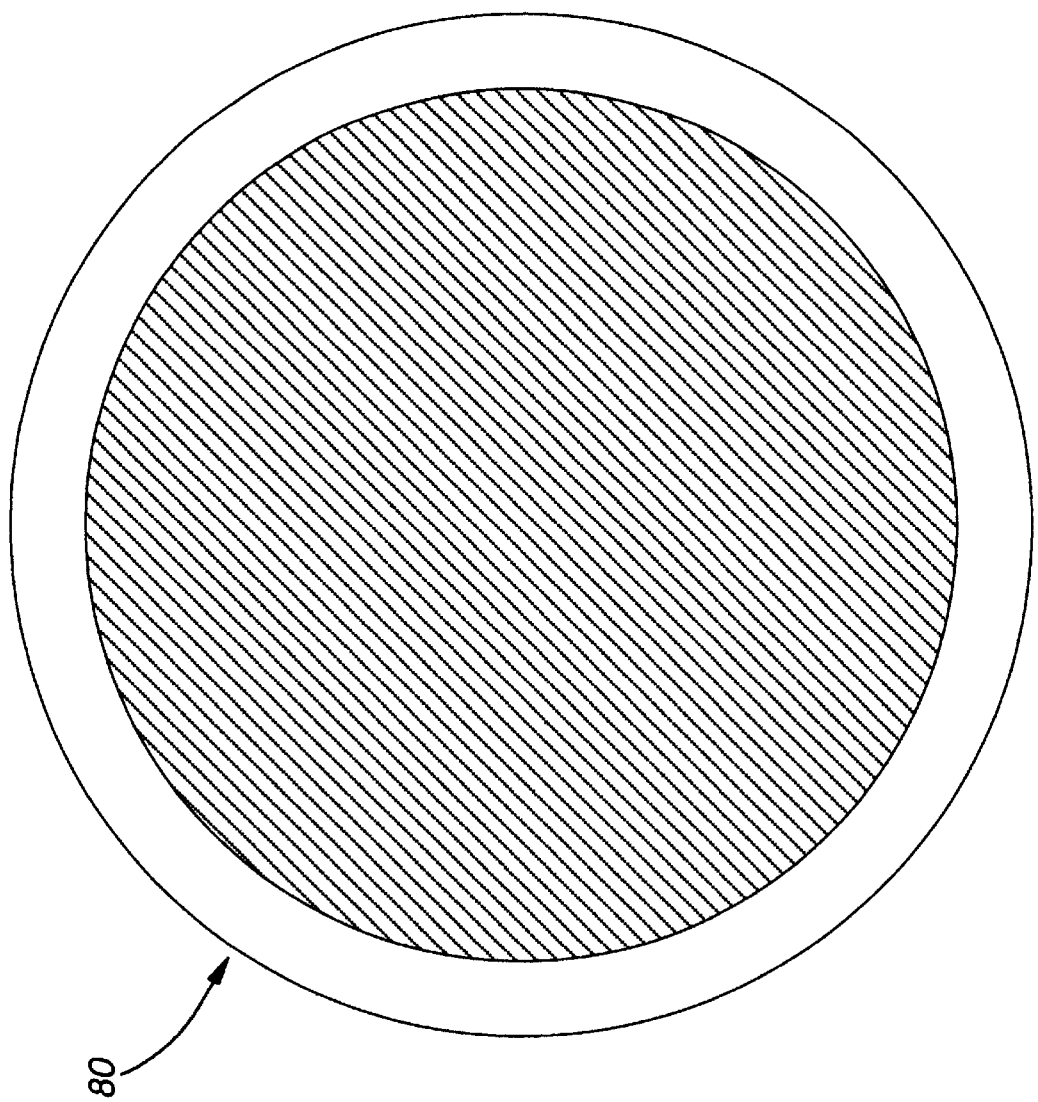
FIG. 8 is a pictorial representation of a plain circular susceptor blank.

The patterned susceptor 70 of FIG. 7 has a small central microwave transparent window 71. The window 71 is surrounded by a first concentric annular arrangement of four patch shaped features substantially identical to patch 72. The patch 72 is roughly trapezoidal in shape, having two opposing edges corresponding to just under 72° of arc at radii 3 mm and 10 mm, and two other opposing edges aligned along radial lines. The minimum microwave transparent spaces between patch 72 and adjacent patches in the first annular arrangement is 2 mm. The first annular arrangement of patches is surrounded by a second concentric annular arrangement of fourteen patch shaped features substantially identical to patch 73. The patch 73 is roughly trapezoidal in shape, having two opposing edges corresponding to just under 18° of arc at radii 12.4 mm and 21 mm, and two other opposing edges aligned along radial lines. The minimum microwave transparent space between patch 73 and adjacent patches in the second annular arrangement is 1.7 mm. The microwave transparent space between patch 73 and 72 is 2.4 mm. The second annular arrangement of patches is surrounded by a continuous annular strip 74 having two opposing edges at radii 22.6 mm and 25.2 mm. The continuous annular strip 74 is surrounded by a concentric annular arrangement of sixteen microwave transparent windows substantially identical to window 75. The window 75 is roughly trapezoidal in shape, being defined by two opposing edges corresponding to just under 22.5° of arc at radii 25.2 mm and 30.5 mm, and two other opposing edges aligned along radial lines. The minimum microwave interactive space between the window 75 and adjacent windows is 2 mm. The annular arrangement of windows is surrounded by a continuous annular strip 76 having two opposing edges at radii 30.5 mm and 47 mm.

An annular band of coherent susceptor material 78 surrounds and is concentric with the annular strip 75. An array of microwave transparent apertures 77a and 77b is formed between the annular strip 75 and the annular band of susceptor material 77. The annular band of susceptor material 78 is provided in the sidewall region 26 (as shown in FIG. 1) and provides both a shielding effect about the periphery of the food product to prevent overcooking, while at the same time providing a browning and crisping effect through the generation of radiant heat. As shown in FIG. 7, the microwave transparent apertures are composed of a band of alternating rectangular-shaped apertures 77a and pairs of circular apertures 77b arranged radially with respect to each other. The microwave transparent apertures 77a and 77b fall within the fold region 24 (as shown in FIG. 1) of the patterned susceptor 70. The microwave transparent apertures 77a, 77b help minimize delamination in the highly stressed fold region between the bottom and the sidewall and provide a generally transmissive area to improve the cooking of the heel of the food product. Finally, a microwave transparent flange 79 is formed surrounding and concentric with the annular band of susceptor material 78 and extending to the edge of the patterned susceptor 70. The microwave transparent flange 79 does not heat like the susceptor covered regions of the patterned susceptor 70 and thereby provides a surface for easy grasping or holding by the user. The microwave transparent flange 79 further allows direct heating, for example, of a pie crust edge, from the incident microwave energy.

The susceptor patterns 40, 50, 60 and 70 when formed into a bowl are believed to function on the bowl bottom as follows. Continuous and relatively thick annular strips of microwave interactive material such as the annular strip 76 (FIG. 7) tend to reflect significant amounts of microwave energy. Similarly, having relatively large patches in an annular arrangement, such as the patch 45 (FIG. 4), tends to reflect some microwave energy. When such arrangements are positioned at a large radial distance from the center of the susceptor pattern, as in the susceptor patterns 40 and 70, some of the microwave energy reflected at the periphery is directed toward the center of the susceptor pattern to increase the amount of microwave heating toward the center. The use of an annular arrangement of windows such as the window 75 (FIG. 7) at certain radial positions increases the transmission of microwave energy at the radial position, which advantageously increases the amount of microwave energy for product heating. Having relatively smaller patches in an annular arrangement positioned at a large radial distance from the center, such as the patch 55 (FIG. 5) and 65 (FIG. 6), improves uniformity but also tends to lessen reflectance and increase transmission in the periphery. However, this result may be advantageous for certain types of food product.

The reflectance—absorption—transmission ("RAT") characteristics of the susceptor patterns 40, 50, 60, and 70 in the bowl bottom are set forth in Table 1, along with the RAT characteristics of the plain susceptor 80 shown in FIG. 8. These characteristics are an average of RAT measurements made on several samples using an E-field strength of about 5 KV/m. Table 1 also includes merit factor ("M.F.") data, which represents an evaluation of the effective heating performance of the susceptor packaging under operation. The merit factor is calculated as the ratio of the percentage (%) of absorption power $P_{ABS}$ to the net amount of 1 minus the percentage (%) of reflection power $P_{REF}$, or $$M.F.=P_{ABS}/(1-P_{REF})$$

The plain susceptor pattern 80 has a very high amount of reflectance, a low amount of transmission, and a high amount of absorption. The susceptor pattern 70, which uses a continuous annular strip at the periphery of the pattern and an adjoining annular arrangement of windows, has a moderate amount of reflection, a high amount of transmission, and a high amount of absorption. The susceptor pattern 40 has some reflection, a high amount of transmission, and a moderate amount of absorption. The susceptor patterns 50 and 60 have only a little reflection, a very high amount of transmission, and a moderate amount of absorption.

TABLE 1

| Susceptor Pattern | Reflection | Transmission | Absorption | M.F. |
|---|---|---|---|---|
| 80 | 61% | 5% | 34% | 88% |
| 70 | 11% | 50% | 39% | 44% |
| 40 | 2% | 77% | 20% | 21% |
| 50 | 1% | 84% | 15% | 15% |
| 60 | 1% | 85% | 14% | 14% |

The performance of the susceptor patterns 40, 50, 60, 70 and 80 when used with an experimental food product load, a chicken pot pie, is shown in Tables 2–10. Tables 2–4 show respectively the minimum temperatures, the maximum temperatures, and the average temperatures of filling for four samples cooked in oven A. Tables 5–7 show respectively the minimum temperatures, the maximum temperatures, and the average temperatures of filling for four samples cooked in oven B. Tables 8–10 show respectively the minimum temperatures, the maximum temperatures, and the average temperatures of filling for four samples cooked in oven C. Ovens A, B and C are all common types of commercial ovens. The food products were cooked for 9 to 10 minutes at the standard full power setting of the ovens. Temperatures were measured to about 2 minutes after completion of cooking with an array of temperature probes used to sense the temperature of the filling at a variety of points in the filling. The minimum temperature tables, namely Tables 2, 5, and 8, are the most significant tables because it is desirable that all parts of the food product be heated above a minimum temperature. Standard deviation values are also reported in Tables 2, 5, and 8, since not only should a particular minimum temperature be exceeded, but an acceptable average minimum temperature also should be consistently realized. Typically, the lowest temperature region of the filling is at or near the center, roughly between midlevel and the bottom, although the precise location depends on the type of filling between density. The maximum temperature region typically is at the periphery of the food product.

TABLE 2

| Sample Number | Pattern 80 | Pattern 60 | Pattern 40 | Pattern 50 | Pattern 70 |
|---|---|---|---|---|---|
| 1 | 150 | 171 | 155 | 156 | 160 |
| 2 | 149 | 170 | 179 | 160 | 172 |
| 3 | 120 | 160 | 172 | 185 | 190 |
| 4 | 156 | 155 | 163 | 171 | 176 |
| Avg. Min. (° F.) | 144 | 164 | 167 | 168 | 175 |
| Standard Deviation (° F.) | | 8.1 | 10.5 | 13.0 | 12.4 |

TABLE 3

| Sample Number | Pattern 80 | Pattern 60 | Pattern 40 | Pattern 50 | Pattern 70 |
|---|---|---|---|---|---|
| 1 | 199 | 205 | 209 | 206 | 204 |
| 2 | 206 | 204 | 210 | 206 | 202 |
| 3 | 202 | 205 | 204 | 209 | 209 |

TABLE 3-continued

| Sample Number | Pattern 80 | Pattern 60 | Pattern 40 | Pattern 50 | Pattern 70 |
|---|---|---|---|---|---|
| 4 | 205 | 205 | 207 | 203 | 208 |
| Avg. Max. (° F.) | 203 | 205 | 208 | 206 | 206 |

TABLE 4

| Sample Number | Pattern 80 | Pattern 60 | Pattern 40 | Pattern 50 | Pattern 70 |
|---|---|---|---|---|---|
| 1 | 181 | 192 | 189 | 189 | 188 |
| 2 | 188 | 193 | 200 | 189 | 193 |
| 3 | 180 | 191 | 190 | 198 | 203 |
| 4 | 188 | 183 | 189 | 191 | 196 |
| Avg. Avg. (° F.) | 184 | 190 | 192 | 192 | 195 |

TABLE 5

| Sample Number | Pattern 80 | Pattern 60 | Pattern 40 | Pattern 50 | Pattern 70 |
|---|---|---|---|---|---|
| 1 | 147 | 158 | 155 | 146 | 181 |
| 2 | 162 | 158 | 173 | 160 | 153 |
| 3 | 130 | 160 | 167 | 166 | 182 |
| 4 | 167 | 141 | 154 | 159 | 125 |
| Avg. Min. (° F.) | 152 | 154 | 162 | 158 | 160 |
| Standard Deviation (° F.) | | 8.9 | 9.3 | 8.4 | 27.1 |

TABLE 6

| Sample Number | Pattern 80 | Pattern 60 | Pattern 40 | Pattern 50 | Pattern 70 |
|---|---|---|---|---|---|
| 1 | 208 | 208 | 196 | 207 | 210 |
| 2 | 208 | 203 | 204 | 208 | 193 |
| 3 | 197 | 201 | 207 | 209 | 207 |
| 4 | 213 | 200 | 207 | 208 | 208 |
| Avg. Max. (° F.) | 206.5 | 203 | 203.5 | 208 | 204.5 |

TABLE 7

| Sample Number | Pattern 80 | Pattern 60 | Pattern 40 | Pattern 50 | Pattern 70 |
|---|---|---|---|---|---|
| 1 | 191 | 192 | 182 | 191 | 197 |
| 2 | 191 | 191 | 194 | 190 | 179 |
| 3 | 179 | 189 | 190 | 195 | 199 |
| 4 | 190 | 183 | 191 | 191 | 189 |
| Avg. Avg. (° F.) | 188 | 189 | 189 | 192 | 191 |

TABLE 8

| Sample Number | Pattern 80 | Pattern 60 | Pattern 40 | Pattern 50 | Pattern 70 |
|---|---|---|---|---|---|
| 1 | 118 | 147 | 160 | 142 | 155 |
| 2 | 132 | 138 | 151 | 129 | 142 |
| 3 | 119 | 165 | 141 | 134 | 163 |
| 4 | 127 | 138 | 140 | 142 | 150 |

TABLE 8-continued

| Sample Number | Pattern 80 | Pattern 60 | Pattern 40 | Pattern 50 | Pattern 70 |
|---|---|---|---|---|---|
| Avg. Min. (° F.) | 124 | 147 | 148 | 137 | 153 |
| Standard Deviation (° F.) | 12.7 | 9.4 | 6.4 | 8.8 | |

TABLE 9

| Sample Number | Pattern 80 | Pattern 60 | Pattern 40 | Pattern 50 | Pattern 70 |
|---|---|---|---|---|---|
| 1 | 205 | 200 | 207 | 203 | 203 |
| 2 | 198 | 198 | 206 | 194 | 193 |
| 3 | 191 | 200 | 204 | 200 | 202 |
| 4 | 201 | 202 | 205 | 185 | 196 |
| Avg. Max. (° F.) | 199 | 200 | 206 | 196 | 199 |

TABLE 10

| Sample Number | Pattern 80 | Pattern 60 | Pattern 40 | Pattern 50 | Pattern 70 |
|---|---|---|---|---|---|
| 1 | 179 | 184 | 190 | 183 | 184 |
| 2 | 179 | 180 | 193 | 176 | 176 |
| 3 | 168 | 187 | 183 | 179 | 189 |
| 4 | 176 | 184 | 182 | 165 | 182 |
| Avg. Avg. (° F.) | 176 | 184 | 187 | 176 | 183 |

Turning first to the performance of the various patterned susceptors in achieving a minimum heating of the food product, Table 2 shows that pattern 70 has the best results and pattern 40 the second best results in oven A, Table 5 shows that pattern 40 has the best results and pattern 50 the second best results in oven B, and Table 6 shows that pattern 70 has the best results and pattern 40 the second best results in oven B. Overall, the susceptor pattern 40 is the best for the chicken pot pie food product used in the experiments, consistently achieving high absolute and average minimum temperatures in all ovens at relatively low standard deviations. While the susceptor pattern 70 performed very well in ovens A and C, its performance in oven B was marred by a low absolute minimum temperature of 125° in the fourth sample, as well as by a high standard deviation value of 27.1. Hence, the susceptor pattern 70 was judged not as desirable as the susceptor pattern 40 for the particular chicken pot pie food product. The susceptor patterns 50 and 60 also did not perform as well as the susceptor pattern 40 for the particular chicken pot pie food product, although their performance for other types of food products may be better. The plain susceptor 80, which was used as a control, performed poorly relative to all of the patterned susceptors 40, 50, 60 and 70.

Figure 9:
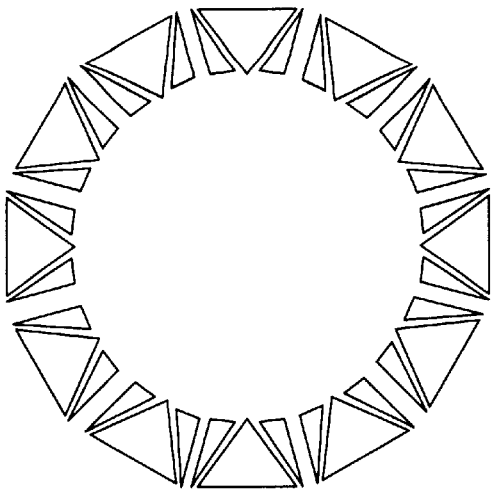
FIG. 9 is a schematic representation of an alternative arrangement of susceptor features.
Figure 10:
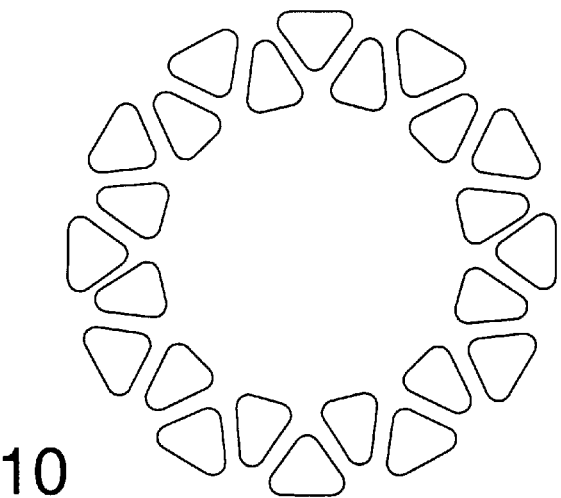
FIG. 10 is a schematic representation of another alternative arrangement of susceptor features.
Figure 11:
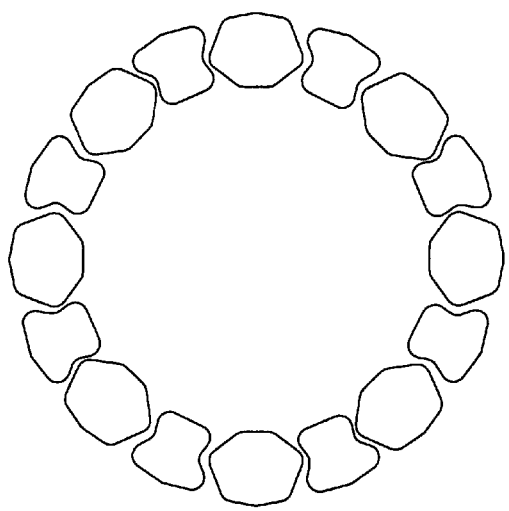
FIG. 11 is a schematic representation of another alternative arrangement of susceptor features.
Figure 12:
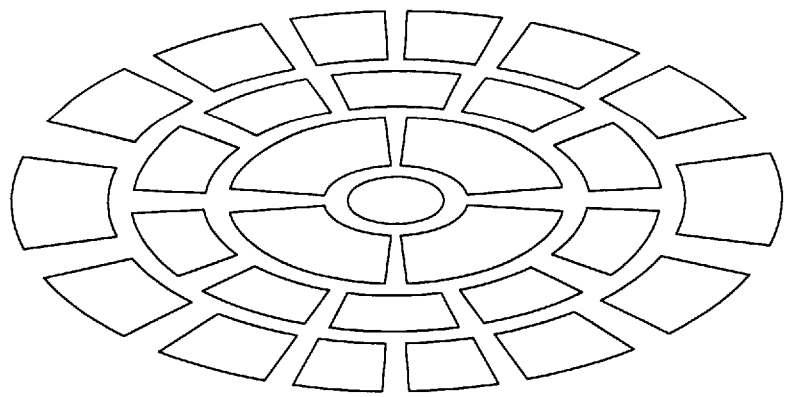
FIG. 12 is a pictorial representation of an elliptical arrangement of susceptor features.
Figure 13:
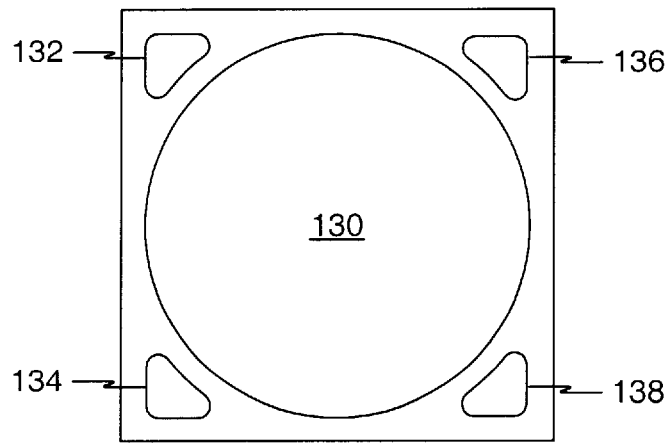
FIG. 13 is a pictorial representation of a square container using a circular arrangement of susceptor features.
Figure 14:
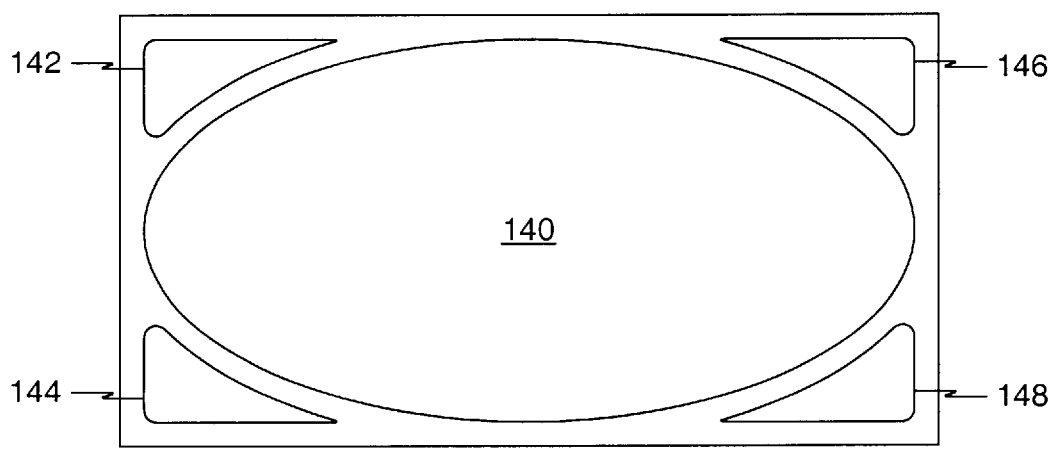
FIG. 14 is a pictorial representation of a rectangular container using an elliptical arrangement of susceptor features.

While the shape and size of the features within each concentric annular arrangement shown in FIGS. 4–7 preferably are generally the same, differently shaped and sized features repeating in a regular pattern may also be used if desired. For example, FIG. 9 shows a repeating pattern of differently sized triangular features, FIG. 10 shows a repeating pattern of offset irregular triangular features with rounded corners, and FIG. 11 shows a repeating pattern of features having somewhat interlocking edges. Moreover, although a circular shape is preferred for the patterned susceptor because of the complete symmetry, the principles described herein may also be used with oval and other elliptical bowls as well as rectangular and square trays. FIG. 12 shows an example of a patterned susceptor 120 for an oval bowl. FIGS. 13 and 14 show examples of a circular patterned susceptor 130 and an oval patterned susceptor 140 which are useful for square, rectangular, and other shapes of the tray. Since the circular and elliptical patterns do not reach into the corners, supplemental susceptor features 132, 134, 136 and 138 (FIG. 13) and 142, 144, 146 and 148 (FIG. 14) of any suitable shape are used to improve food product heating in these areas.

Preferably, the features of the patterned susceptor, whether microwave interactive or microwave transparent, should be such that the largest dimension does not exceeds $\lambda_0/4$ where $\lambda_0$ is the wavelength of the microwave energy. Typically, the value of $\lambda_0$ is 12.2 cm, so the largest dimension should be limited to about 3 cm. Otherwise, locally non-uniform heating may occur due to the influence on standing wave distribution by the designed patterns.

The fold region 24 of the susceptor blank 20 minimizes de-lamination of the bowl 30 in the highly stressed folded region between the bottom and sidewall of the bowl 30. Typically, the heal of the frozen pie dough shell does not firmly contact the fold region of the bowl, which in the case of the plain susceptor 80 of FIG. 8 leads not only to poor cooking and browning of the heel of the pie dough shell, but also to localized overheating and de-lamination of the susceptor from the paper substrate. The use of a variety of microwave transparent window features in the fold region addresses the poor cooking and browning problem by allowing the transmission of more microwave energy into the heel region, thereby improving the direct cooking of the pie dough shell and filling in the heel region. The use of curvilinear closed forms such as circles and ellipses is useful for preventing de-lamination since they help to uniformly relieve stresses arising in the surrounding microwave interactive material due to localized heating.

The sidewall region 26 of the susceptor blank 20 is crimped to form the sidewall of the bowl 30. The sidewall region 26 functions as a shield to prevent excessive heating of the food product filling near the sidewalls as well as to provide a suitable degree of browning of the sides of the pie dough shell. The sidewall region 26 preferably is a continuous area of microwave interactive material, although some patterning consistent with the general requirements may be used.

The flange region 28 is of the susceptor blank 20 is also crimped to form a flange or lip on the bowl 30 for supporting the crust of the pie dough shell. The flange region 28 preferably is entirely microwave transparent, although some microwave interactive material may be used if consistent with the general requirements. The lack of a susceptor results in less heating of the crust surface, so that the crust in the flange region cooks without excessively dark browning.

The scope of our invention is set forth in the following claims. The description of the various embodiments set forth herein is illustrative of our invention and is not intended to limit the scope thereof. Variations and modifications of the embodiments disclosed herein will become apparent to those of ordinary skill in the art upon reading this patent document, and alternatives to and equivalents of the various elements of the embodiments will be known to those of ordinary skill in the art. These and other variations and modifications of the embodiments disclosed herein may be made without departing from the scope and spirit of the invention as set forth in the following claims.

What is claimed is:

1. A microwave heating surface comprising a plurality of non-overlapping closed curvilinear heating regions distributed generally throughout the heating surface, at least a first one of the closed curvilinear heating regions comprising a first plurality of discrete microwave absorptive features that are spaced-apart for enhancing microwave transmission and reducing microwave reflectance of the heating surface under load relative to a plain susceptor.

2. The microwave heating surface of claim 1 wherein the first plurality of microwave absorptive features comprises dissimilar microwave absorptive features distributed throughout the first heating region.

3. The microwave heating surface of claim 2 wherein the dissimilar microwave absorptive features are disposed in a repeating pattern throughout the first heating region.

4. The microwave heating surface of claim 1 wherein the first plurality of microwave absorptive features comprises similar microwave absorptive features distributed throughout the first heating region.

5. The microwave heating surface of claim 1 wherein each of the microwave absorptive features in the first plurality of microwave absorptive features is a patch comprising two essentially parallel opposing sides defined by respective boundaries of the first heating region.

6. The microwave heating surface of claim 1 wherein the first plurality of microwave absorptive features have a largest dimension no greater than one-quarter of the wavelength of the microwave energy.

7. The microwave heating surface of claim 1 wherein the first plurality of microwave absorptive features comprise thin metallic film patches formed on a polymeric substrate.

8. The microwave heating surface of claim 1 wherein at least a second one and a third one of the closed curvilinear heating regions comprise respective second and third pluralities of discrete microwave absorptive features that are spaced-apart for enhancing microwave transmission and reducing microwave reflectance of the heating surface under load relative to a plain susceptor.

9. The microwave heating surface of claim 8 wherein the first, second and third pluralities of microwave absorptive features have a largest dimension no greater than one-quarter of the wavelength of the microwave energy.

10. The microwave heating surface of claim 8 wherein the first, second and third pluralities of microwave absorptive features are thin metallic film patches formed on a polymeric substrate.

11. The microwave heating surface of claim 1 wherein the plurality of non-overlapping closed curvilinear heating regions are elliptical.

12. The microwave heating surface of claim 1 wherein the plurality of non-overlapping closed curvilinear heating regions are generally circular and concentric.

13. The microwave heating surface of claim 1 wherein:
at least one of the closed curvilinear heating regions comprises a generally continuous microwave absorptive feature having a plurality of spaced-apart apertures therein; and
at least one of the closed curvilinear heating regions comprises a generally continuous microwave absorptive feature.

14. A microwave heating surface comprising a plurality of discrete microwave absorptive features distributed generally throughout the microwave heating surface in a plurality of non-overlapping closed curvilinear heating regions and spaced-apart for enhancing microwave transmission and reducing microwave reflectance of the heating surface under load relative to a plain susceptor.

15. A microwave susceptor structure comprising:
a first layer of microwave transparent material; and
a second layer of patterned microwave interactive material;
wherein the patterned microwave interactive material comprises a plurality of arrangements of microwave interactive features, the arrangements comprising repeating patterns of some of the microwave interactive features disposed generally along respective close plane curves that are generally symmetrical about at least two orthogonal axes.

16. The microwave susceptor structure of claim 15 wherein:
the first layer comprises a polymeric sheet; and
the microwave interactive material of the second layer comprises thin aluminum sputter-deposited on a first side of the polymeric sheet.

17. The microwave susceptor structure of claim 15 wherein the arrangements are disposed generally along respective non-overlapping ellipses symmetrical about respective major and minor axes, the major axis of the arrangements lying on one of the orthogonal axes and the minor axis of the arrangements lying on another of the orthogonal axes.

18. The microwave susceptor structure of claim 15 wherein the arrangements are disposed generally along respective concentric circles of different radius.

19. The microwave susceptor structure of claim 15 wherein the patterned microwave interactive material further comprises at least one arrangement of microwave transparent features, the arrangement of microwave transparent features comprising a repeating pattern of the microwave transparent features disposed generally along a close plane curve that is generally symmetrical about the at least two orthogonal axes.

20. The microwave susceptor structure of claim 15 wherein the patterned microwave interactive material further comprises a microwave interactive strip, the microwave interactive strip being disposed generally along a close plane curve that is generally symmetrical about the at least two orthogonal axes.

21. The microwave susceptor structure of claim 15 wherein the patterned microwave interactive material further comprises a close plane curve feature of microwave interactive material that is generally symmetrical about the at least two orthogonal axes.

22. The microwave susceptor structure of claim 15 wherein the patterned microwave interactive material further comprises:
at least one arrangement of microwave transparent features, the arrangement of microwave transparent features comprising a repeating pattern of the microwave transparent features disposed generally along a close plane curve that is generally symmetrical about the at least two orthogonal axes; and
a microwave interactive strip, the microwave interactive strip being disposed generally along a close plane curve that is generally symmetrical about the at least two orthogonal axes.

23. A microwave susceptor structure comprising:
a first layer of microwave transparent material; and
a second layer of patterned microwave interactive material comprising:
a first arrangement of substantially identical first microwave interactive features along a circle of a first radius;

a second arrangement of substantially identical second microwave interactive features along a circle of a second radius greater than the first radius, the second arrangement being concentric with the first arrangement;

a third arrangement of substantially identical third microwave interactive features along a circle of a third radius greater than the second radius, the third arrangement being concentric with the second arrangement; and a fourth arrangement of substantially identical fourth microwave interactive features along a circle of a fourth radius greater than the third radius, the fourth arrangement being concentric with the third arrangement.

24. A microwave susceptor structure comprising:

a first layer of microwave transparent material; and a second layer of patterned microwave interactive material comprising:

a first arrangement of substantially identical first microwave interactive features along a circle of a first radius;

a second arrangement of substantially identical second microwave interactive features along a circle of a second radius greater than the first radius, the second arrangement being concentric with the first arrangement;

a third arrangement of substantially identical microwave transparent features along a circle of a third radius greater than the second radius, the third arrangement being concentric with the second arrangement; and a fourth arrangement of a microwave interactive strip along a circle of a fourth radius greater than the third radius, the fourth arrangement being concentric with the third arrangement.

25. A microwave susceptor blank comprising:

a first layer of microwave transparent material;

a second layer of patterned microwave interactive material; and a third layer of microwave transparent material;

wherein the second layer is disposed between the first and third layers;

wherein the patterned microwave interactive material comprises a bottom heating region, a fold region bounding the bottom heating region, and a sidewall region bounding the fold region; and wherein the fold region comprises a plurality of curvilinear microwave transparent features disposed generally through out the fold region in a generally repeating pattern for relieving thermal stress in the fold region during heating of the susceptor.

26. The microwave susceptor blank of claim 25 wherein the curvilinear microwave transparent features are disks of microwave transparent material.

27. A microwave susceptor blank comprising:

a first layer of microwave transparent material;

a second layer of patterned microwave absorptive material formed on the first layer and comprising a bottom heating region, a fold region bounding the bottom heating region, and a sidewall region bounding the fold region; and a third layer of microwave transparent supportive material, the first and third layers being laminated with the second layer disposed therebetween;

wherein the bottom heating region comprises a plurality of non-overlapping closed curvilinear heating regions distributed generally throughout the bottom heating region, at least a first one of the closed curvilinear heating regions comprising a first plurality of discrete spaced-apart microwave absorptive features for enhancing microwave transmission and reducing microwave reflectance of the bottom heating region under load relative to a plain susceptor;

wherein the fold region comprises a generally continuous microwave absorptive feature having a plurality of curvilinear microwave transparent features disposed therein in a generally repeating pattern for relieving thermal stress in the fold region upon exposure thereof to microwave energy; and wherein the sidewall region comprises a generally continuous microwave absorptive feature.

28. The microwave susceptor blank of claim 27 further comprising a flange region disposed about the sidewall region, the flange region being generally devoid of microwave absorptive material.

29. The microwave susceptor blank of claim 27 wherein a second one and a third one of the closed curvilinear heating regions comprise respective second and third pluralities of discrete spaced-apart microwave absorptive features for enhancing microwave transmission and reducing microwave reflectance of the bottom heating region under load relative to a plain susceptor.

30. The microwave susceptor blank of claim 27 wherein:

at least one of the closed curvilinear heating regions comprises a generally continuous microwave absorptive feature having a plurality of spaced-apart apertures therein; and at least one of the closed curvilinear heating regions comprises a generally continuous microwave absorptive feature.

31. A microwave container comprising:

a bottom heating region comprising a plurality of non-overlapping closed curvilinear heating regions distributed generally throughout the bottom heating region and disposed on a microwave transparent supporting substrate, at least a first one of the closed curvilinear heating regions comprising a first plurality of discrete microwave absorptive features that are spaced-apart for enhancing microwave transmission and reducing microwave reflectance of the bottom heating region under load relative to a plain susceptor;

a fold region disposed on the microwave transparent supporting substrate about the bottom region, the fold region comprising a generally continuous microwave absorptive feature having a plurality of curvilinear microwave transparent features disposed therein in a generally repeating pattern for relieving thermal stress in the fold region upon exposure to microwave energy; and a sidewall region disposed on the microwave transparent supporting substrate about the fold region, the sidewall region comprising a generally continuous microwave absorptive feature.

32. The microwave container of claim 31 further comprising a flange region disposed on the microwave transparent supporting substrate about the sidewall region, the flange region being generally devoid of microwave absorptive material.

33. The microwave container of claim 31 wherein a second one and a third one of the closed curvilinear heating regions comprise respective second and third pluralities of discrete spaced-apart microwave absorptive features for enhancing microwave transmission and reducing microwave reflectance of the bottom heating region under load relative to a plain susceptor.

34. The microwave container of claim 31 wherein:

at least one of the closed curvilinear heating regions comprises a generally continuous microwave absorptive feature having a plurality of spaced-apart apertures therein; and at least one of the closed curvilinear heating regions comprises a generally continuous microwave absorptive feature.

35. A microwave container comprising:

a bottom region;

a fold region disposed about the bottom region; and a sidewall region disposed about the fold region;

the bottom region, the fold region, and the sidewall region being formed from a laminated material comprising:
a first layer of microwave transparent material;
a second layer of patterned microwave interactive material; and
a third layer of microwave transparent material, the second layer being disposed between the first and third layers; the patterned microwave interactive material in the bottom region comprising a plurality of arrangements of microwave interactive features, the arrangements comprising repeating patterns of some of the microwave interactive features disposed generally along respective close plane curves that are generally symmetrical about at least two orthogonal axes;

the patterned microwave interactive material in the fold region comprising a plurality of curvilinear microwave transparent features disposed generally through out the fold region in a generally repeating pattern for relieving thermal stress in the fold region during microwave heating; and the patterned microwave interactive material in the sidewall region comprising a microwave interactive strip disposed generally throughout the sidewall region.

36. The microwave container of claim 35, further comprising a flange region disposed about the sidewall region, the flange region being generally devoid of microwave interactive material.

* * * * *